US007299627B2

(12) United States Patent
Corten et al.

(10) Patent No.: US 7,299,627 B2
(45) Date of Patent: Nov. 27, 2007

(54) ASSEMBLY OF ENERGY FLOW COLLECTORS, SUCH AS WINDPARK, AND METHOD OF OPERATION

(75) Inventors: Gustave Paul Corten, Alkmaar (NL); Koert Lindenburg, Petten (NL); Pieter Schaak, Petten (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 0 days.

(21) Appl. No.: 10/520,933

(22) PCT Filed: Jul. 15, 2003

(86) PCT No.: PCT/NL03/00517

§ 371 (c)(1),
(2), (4) Date: Oct. 14, 2005

(87) PCT Pub. No.: WO2004/011799

PCT Pub. Date: Feb. 5, 2004

(65) Prior Publication Data

US 2006/0131889 A1    Jun. 22, 2006

(30) Foreign Application Priority Data

Jul. 15, 2002    (NL)    .................................... 1021078

(51) Int. Cl.
*F03D 1/04*    (2006.01)
*F03D 3/04*    (2006.01)
*F03D 11/04*    (2006.01)

(52) U.S. Cl. ...................................................... 60/398

(58) Field of Classification Search .................. 60/398; 290/42–44, 53–55
See application file for complete search history.

(56) References Cited

U.S. PATENT DOCUMENTS

| | | | | | |
|---|---|---|---|---|---|
| 4,045,144 | A | * | 8/1977 | Loth | ..................... 416/DIG. 4 |
| 4,047,832 | A | * | 9/1977 | Sforza | ................... 416/DIG. 4 |
| 4,182,594 | A | | 1/1980 | Harper et al. | |
| 5,937,644 | A | * | 8/1999 | Dipnall | ......................... 60/398 |
| 6,602,045 | B2 | * | 8/2003 | Hickey | .......................... 415/1 |
| 6,724,097 | B1 | * | 4/2004 | Wobben | ...................... 290/44 |
| 7,008,172 | B2 | * | 3/2006 | Selsam | ........................ 415/4.5 |
| 7,025,567 | B2 | * | 4/2006 | Wobben | ........................ 416/1 |
| 7,042,114 | B2 | * | 5/2006 | Tharp | .......................... 290/54 |
| 2001/0033790 | A1 | | 10/2001 | Hickey | |

FOREIGN PATENT DOCUMENTS

DE    195 48 637    6/1997

OTHER PUBLICATIONS

Dick, E., "Aerodynamic optimisation of a multirotor wind energy system with a large diameter tower", Wind Engineering, vol. 1, No. 4, 1987, pp. 207-224, XP008022904, "Conclusion", $2^{nd}$ paragraph, p. 224.

(Continued)

*Primary Examiner*—Thomas E. Lazo
(74) *Attorney, Agent, or Firm*—Young & Thompson

(57) ABSTRACT

Method and assembly for extracting energy from a flowing fluid. It is proposed to regard all devices of the assembly together as one flow body. In particular those devices on the upstream side of the assembly are set such that they exert lateral (horizontal and/or vertical) forces on the fluid flow, as a result of which flows are produced that guide fast fluid through the energy-extracting devices and guide slow fluid precisely away therefrom. The assembly includes a wind farm and the devices that generate the lateral forces are a type of vortex generators for the atmospheric boundary layer; more particularly they are horizontal or vertical wind turbines positioned at an angle to the wind.

29 Claims, 15 Drawing Sheets

OTHER PUBLICATIONS

Figure 6:
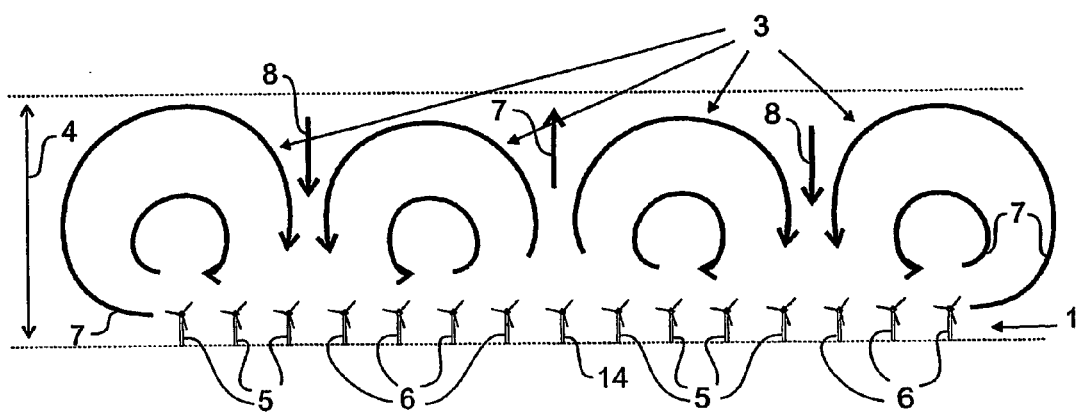

Gorten, G.P., Thesis "Flow separation on wind turbine blades", ISBN 90-393-2592-0, University of Utrecht (The Netherlands), Aug. 1, 2001 XP002258620, pp. 112-114, heading "The Terrain concentration Hypothesis".

Steinbuch, M. et al., "Optimal Control of Wind Power Plants", Journal of Wind Engineering and Industrial Aerodynamics, vol. 27, 1988, pp. 237-246, XP008023141, p. 245, "Conclusions wind farm control".

Weimerskirch, H. et al., "Energy saving in flight formation", Nature, vol. 413, Oct. 18, 2001, pp. 697-698, XP002258619.

* cited by examiner

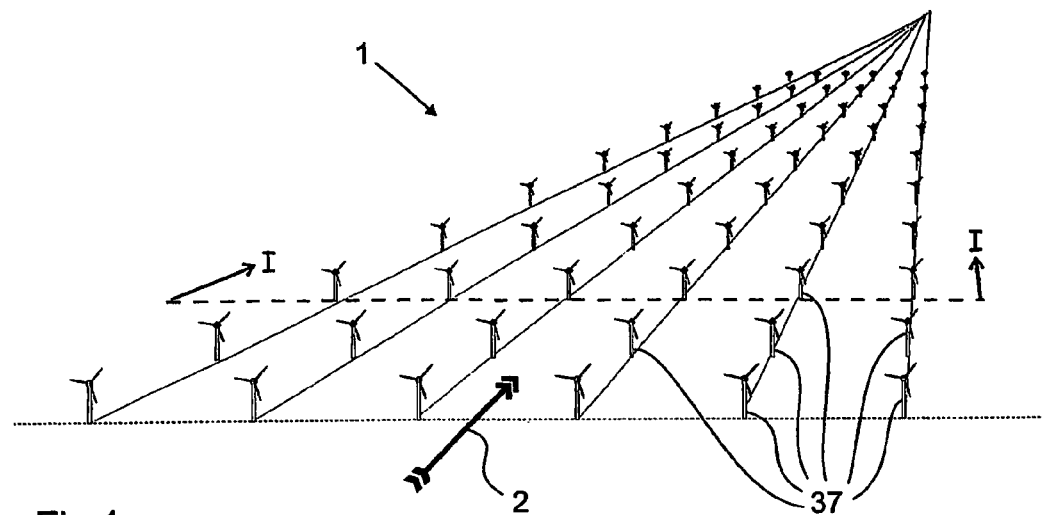
Fig.1
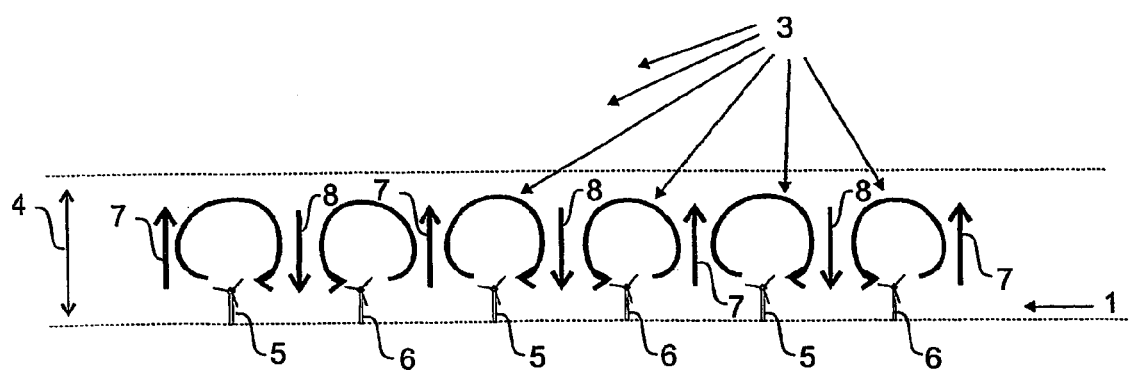
Fig. 2 (I-I)

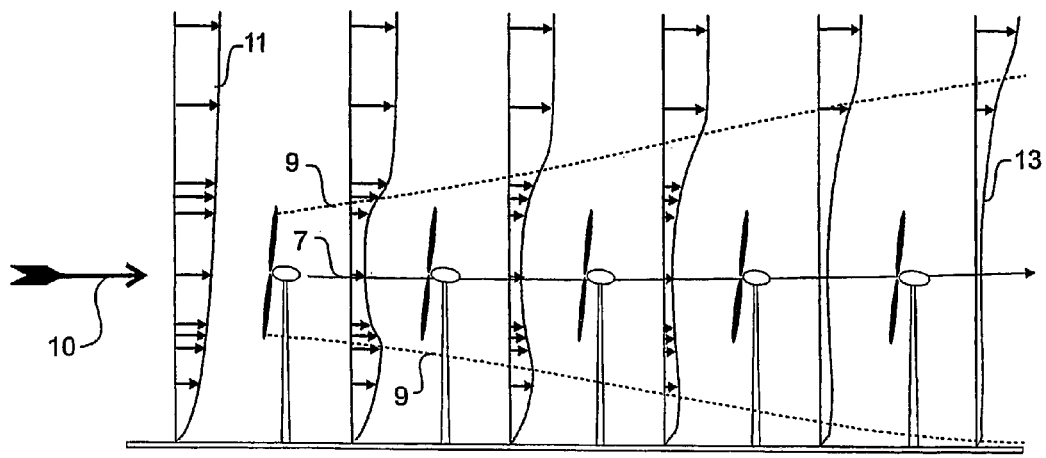
Fig. 3 Prior Art
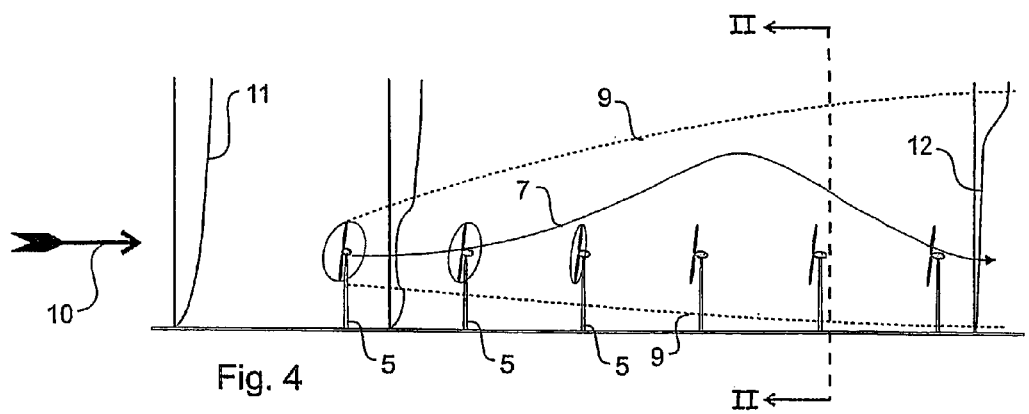
Fig. 4
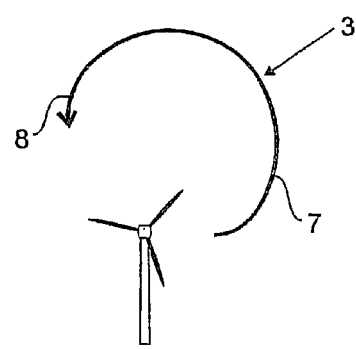
Fig. 5 (II-II)

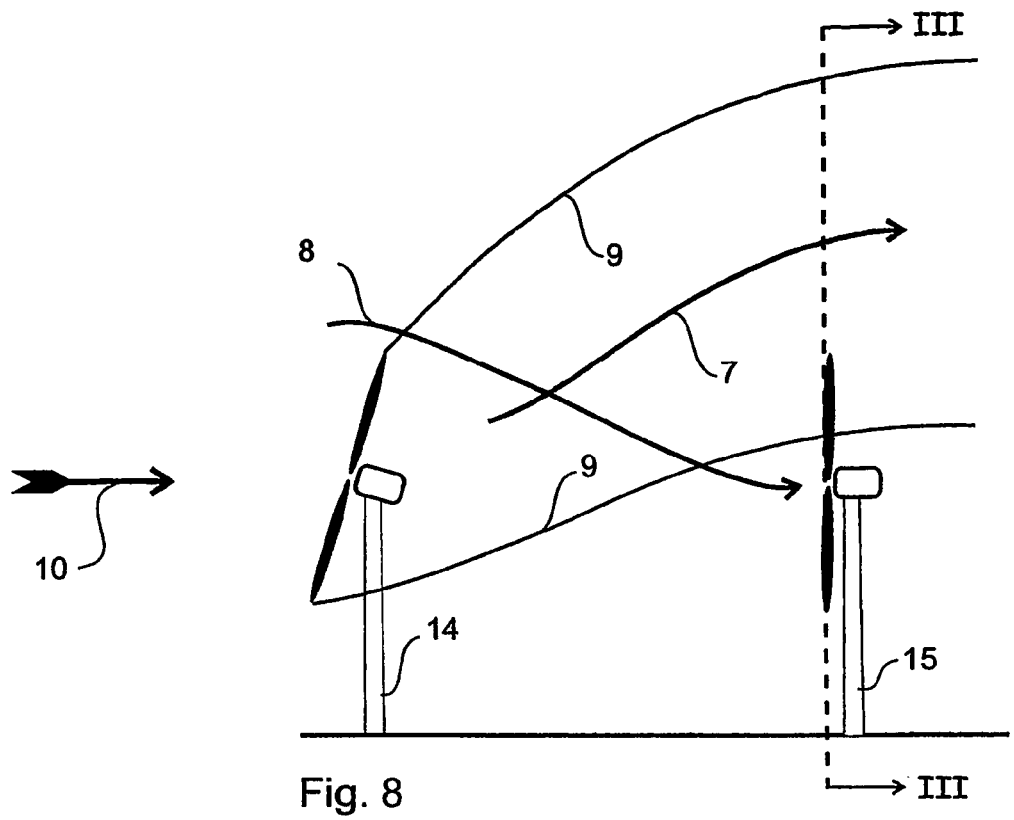
Fig. 8
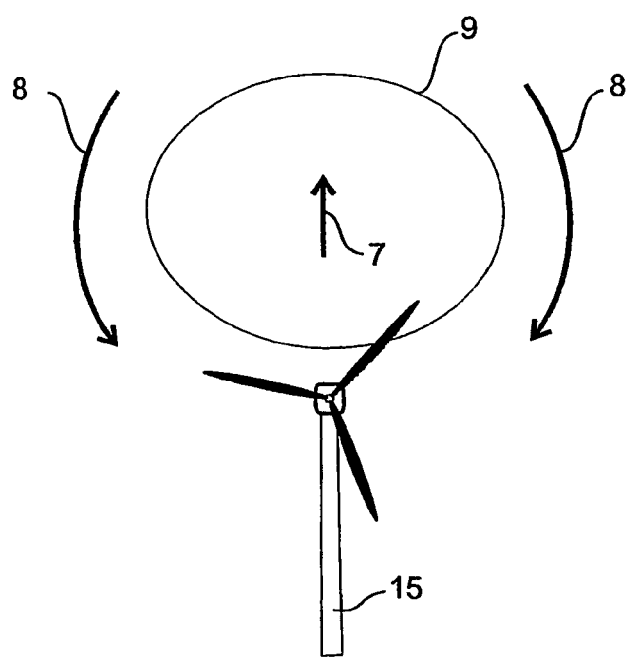
Fig. 9 (III-III)

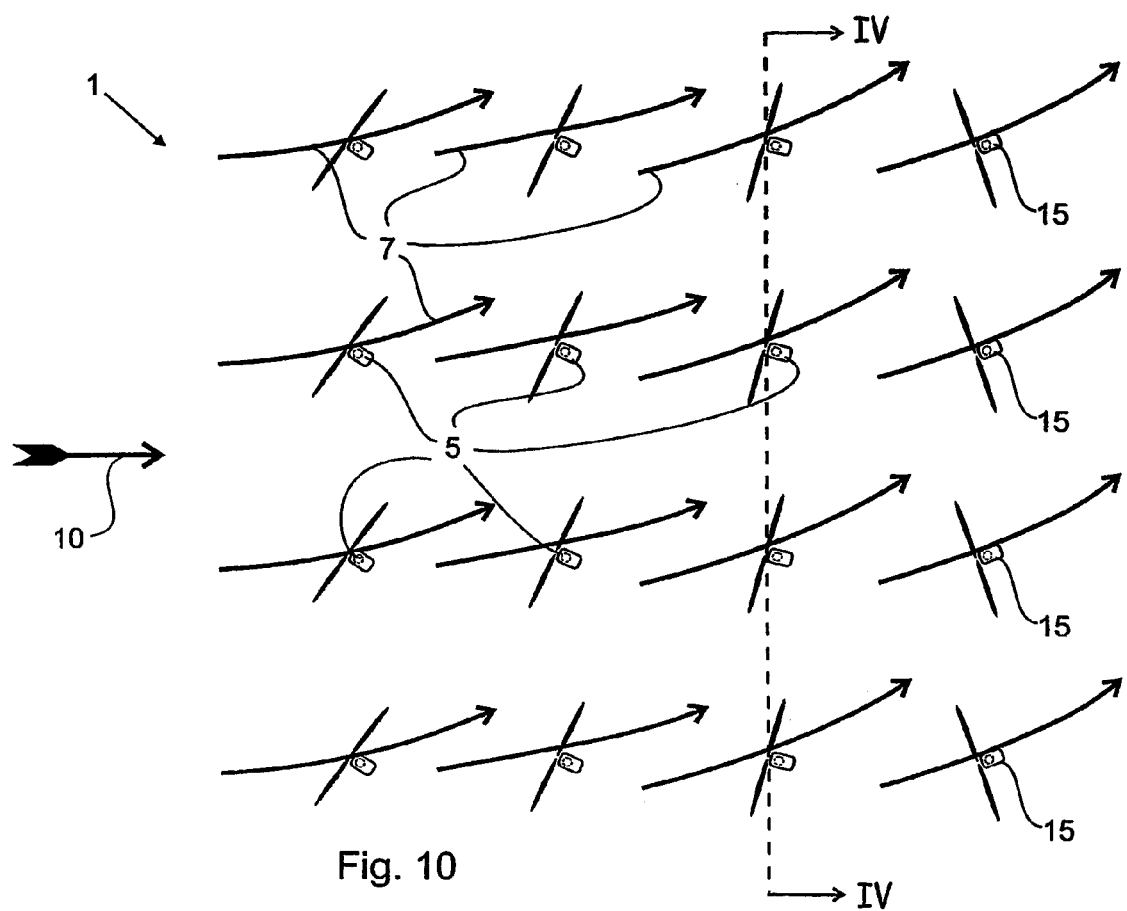
Fig. 10
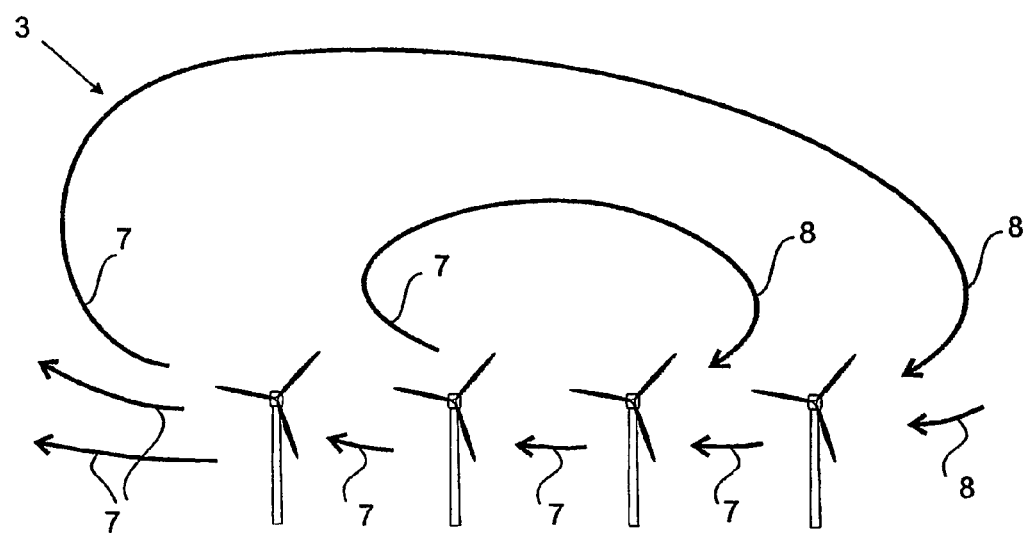
Fig. 11 (IV-IV)

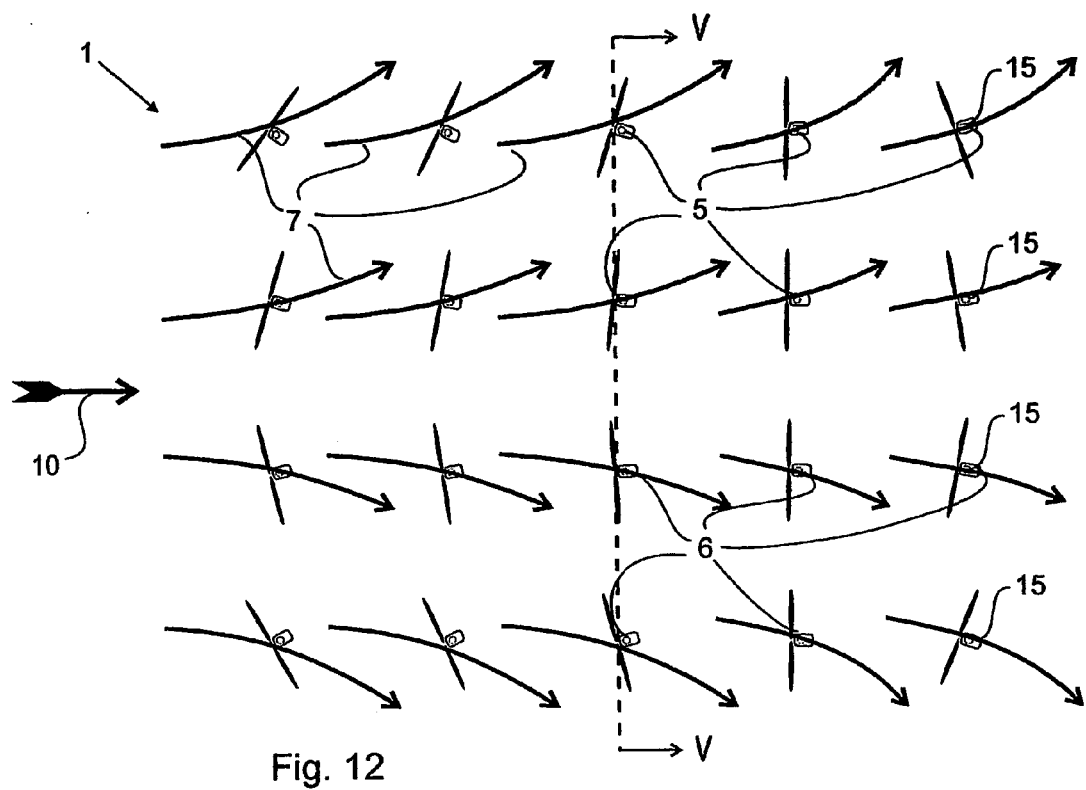
Fig. 12
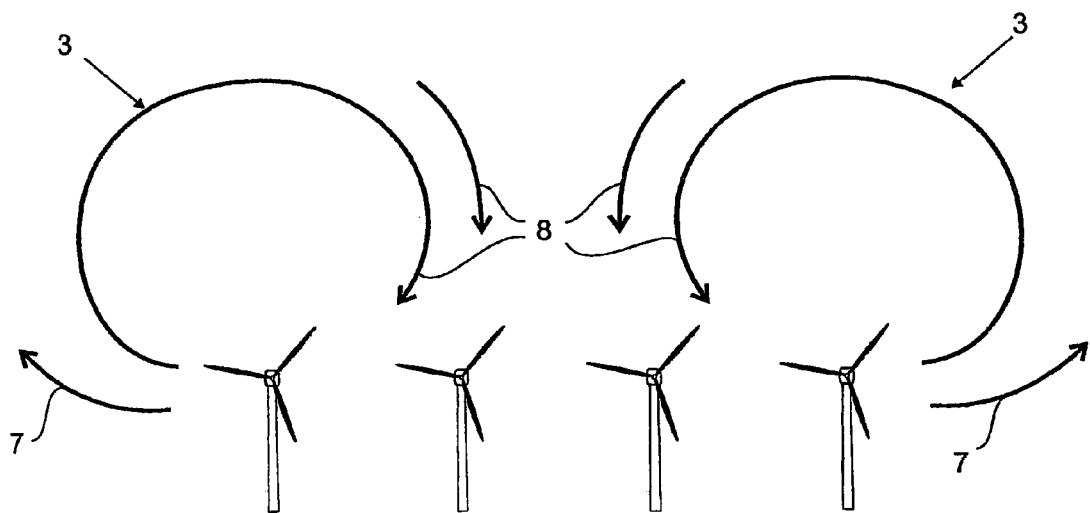
Fig. 13 (V-V)

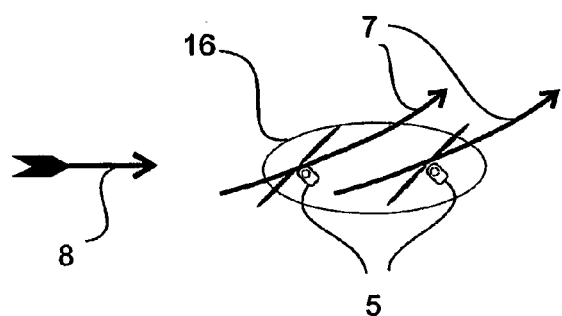
Fig. 14
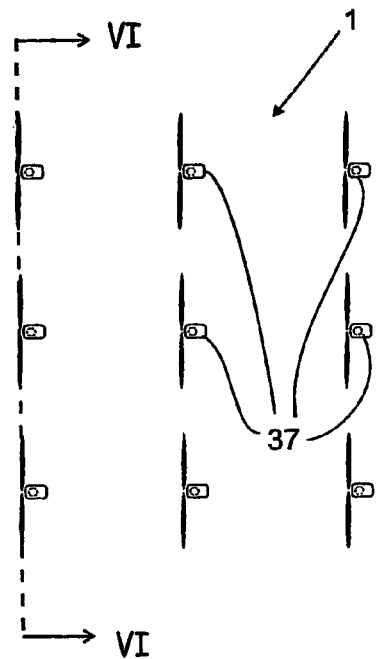
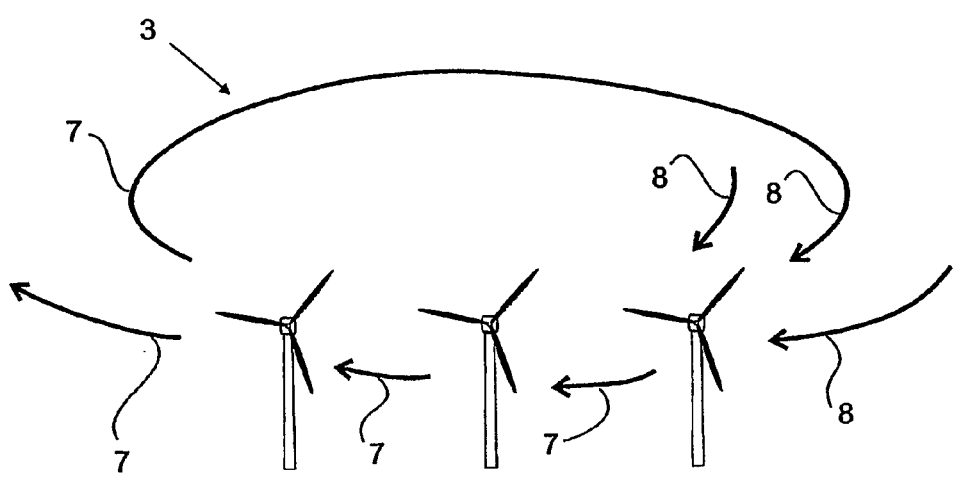
Fig. 15 (VI-VI)

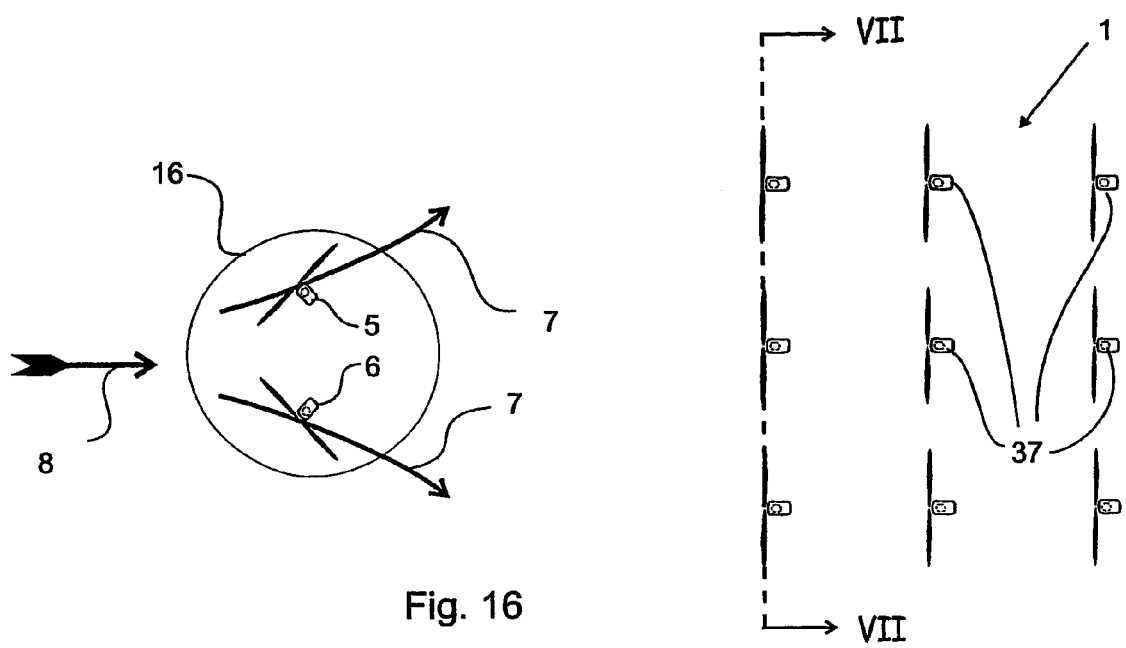
Fig. 16
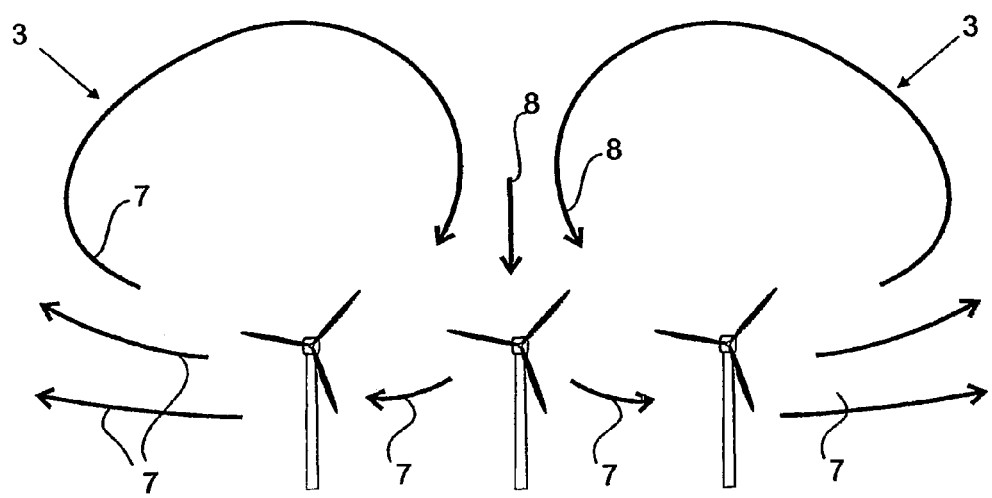
Fig. 17 (VII-VII)

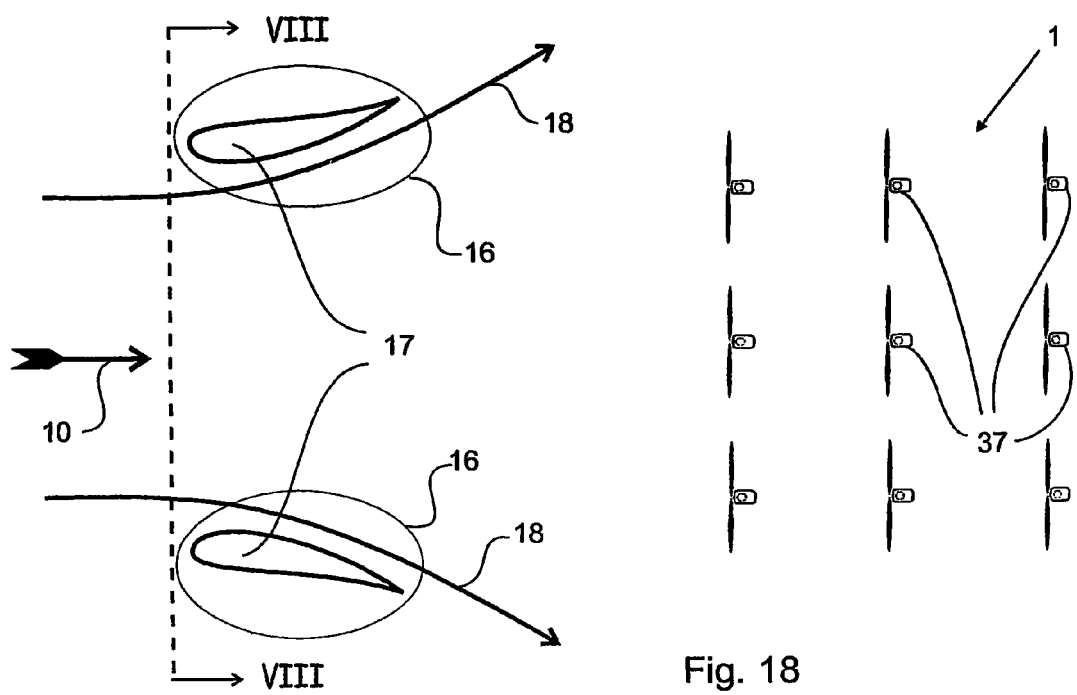
Fig. 18
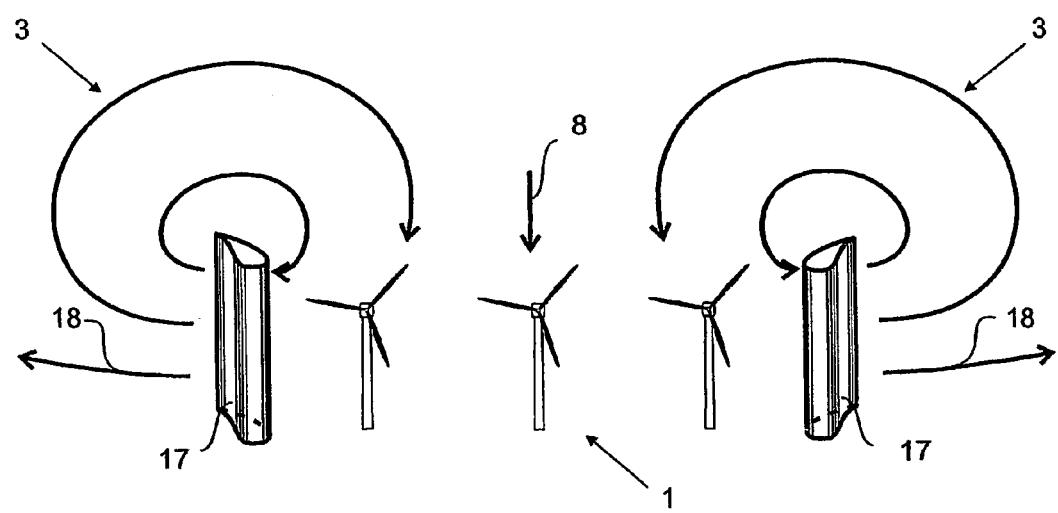
Fig. 19 (VIII-VIII)

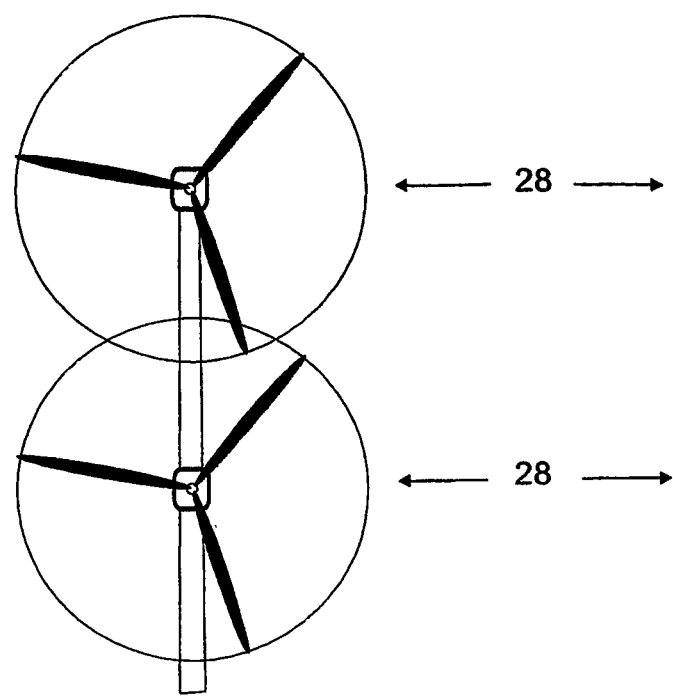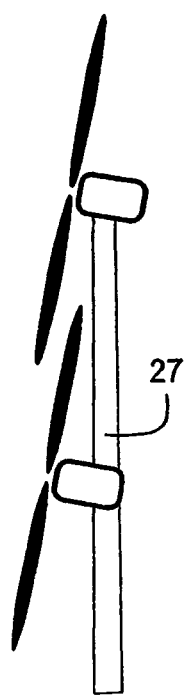
Fig. 27　　　　　Fig. 28
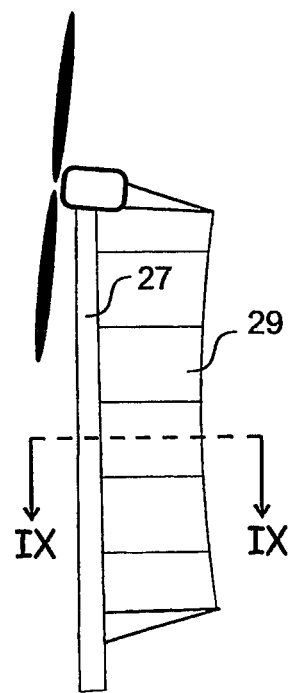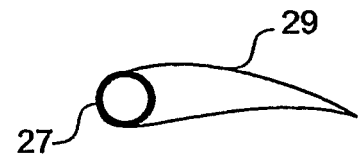
Fig. 29　　　　　Fig. 30 (IX-IX)

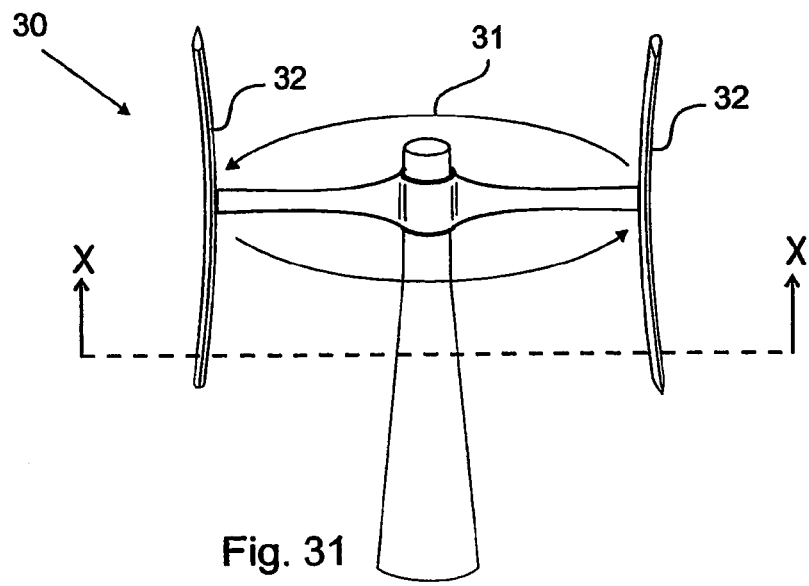
Fig. 31
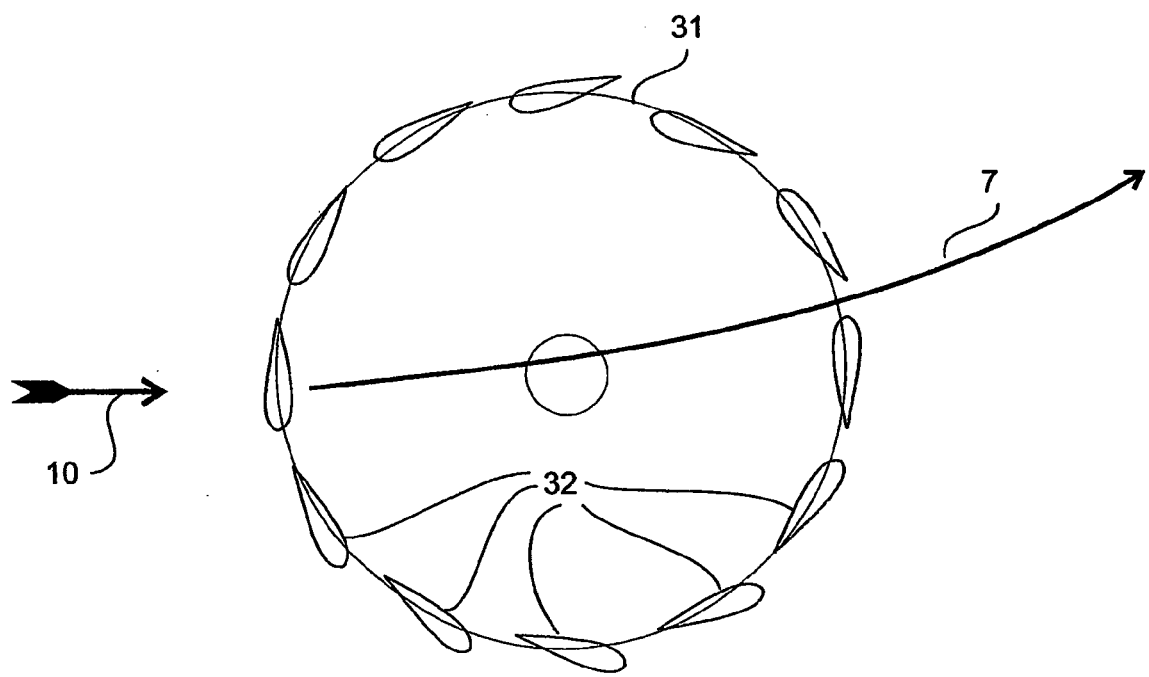
Fig. 32 (X-X)

ASSEMBLY OF ENERGY FLOW COLLECTORS, SUCH AS WINDPARK, AND METHOD OF OPERATION

The present invention relates to a method and/or assembly by means of which energy can be extracted from a flowing fluid, said assembly consisting of multiple assemblies which influence one another. The flowing fluid denotes both wind and (sea)water flows. The devices comprise particular wind turbines.

It is generally known that energy can be extracted from the wind using wind turbines. Both the size of the wind turbines and the number of wind turbines have been increasing rapidly in recent years. Increasingly frequently several turbines are being installed alongside one another in a so-called wind farm or assembly. Because of lack of space on land (especially in Europe) turbines are also frequently being installed offshore. Offshore wind farms that consist of tens of turbines or more have now been planned. Although the insight of the experts is divergent in this regard, wind energy is seen as one of the major energy sources of the future. If this becomes reality, many farms of hundreds of turbines each of a few megawatts installed power will be needed. These types of farms are expensive and therefore it is extremely important that the production of the farms is high, that is to say justifies the costs.

Because a wind turbine extracts kinetic energy from the wind, the wind speed will have dropped behind the turbine. If a wind turbine extracts the maximum amount of energy from the wind it is normal that the wind speed has dropped to less than 50% of the original speed a short distance behind the turbine (for example one diameter). Since the power that can be obtained from the wind is proportional to the third power of the wind speed, the drop in speed means that a second turbine that would be installed in that position is able to achieve only an eighth of the power, compared with the upstream turbine. This effect is often termed the shadow effect and is also termed interference; the loss that occurs is termed shadow loss.

In practice such dramatic drops in power rarely occur because the wind turbines are placed fairly far apart. The distance between turbines is usually 5 to 10 times the turbine diameter. Over that distance the slow wind mixes in the wake with faster wind around it, as a result of which the wind speed at the location of a subsequent turbine has not dropped too much compared with the original wind speed. In brief, the shadow effect decreases by increasing the distance between turbines. However, this measure works only to a certain extent.

The problem is not restricted solely to an adverse interaction between two wind turbines installed after one another in the wind direction, but occurs to a more significant extent in wind farms. The energy that is extracted by the wind turbines that are upstream in a farm, together with the mixing loss explained below, inevitably leads to a drop in speed in the atmospheric boundary layer in which the rest of the farm is located. There is said to be exhaustion of the energy in the atmospheric boundary. In general terms, all turbines located wind upstream constitute a disadvantage for all turbines located wind downstream and yet more comprehensively even turbines downstream will produce a disadvantage for the turbines upstream. The mutual influence (shadow effect) therefore operates not only in the wind direction but, although to a much lesser extent, also wind upstream. In an even broader sense there can also be said to be a shadow effect between different wind farms. An entire farm that is located downstream of another farm can be subject to a substantial reduction in production. Apart from the falls in output already mentioned, operation in the wake can also lead to more fatigue damage to wind turbines. Shadow effects are therefore particularly adverse.

If the number of turbines located one after the other becomes large, increasingly larger distances between the turbines are needed to keep shadow losses acceptable. This means that a large surface area is needed and that the cable lengths between the turbines, and thus the costs, increase. On land a greater distance between the turbines also means that longer roads have to be built, which signifies a further increase in costs. Although placing the wind turbines further apart helps against shadow losses, an appreciable fall in production by the turbines on the lee side in large farms will be unavoidable. The fall can be so large that a farm becomes uneconomic as a result. Losses of 30% or more are generally known from the literature.

In virtually all parts of the world certain wind directions occur more frequently than others. There is then said to be a dominant wind direction, which is defined here as the annual average wind direction in which the major proportion of the annual production is harvested in partial load operation. A guiding or energy-extracting device has an influence on the wind direction. Undisturbed wind direction is defined as the wind direction at the location of a device whilst that device is conceived as having been removed (and thus has no influence). Incidentally, the wind direction varies substantially over a short timescale (seconds to minutes); therefore the term wind direction is understood not as the instantaneous direction but as the average direction, for example over 10 minutes. Shadow effects can also be reduced by designing a wind farm such that it extends mainly perpendicularly to the dominant wind direction. In practice, however, the erection of the wind turbines is also dictated by numerous other interests, such as: what land or sea surface area has been assigned to the wind turbine operator, what are the other functions of the area, what nuisance is caused by the turbines, how do existing power lines run, etc. Consequently, this option will only offer a solution to a limited extent.

The article entitled 'The Application of PIV to the Wake of a Windturbine in Yaw', presented at the '$4^{th}$ International Symposium on PIV', Göttingen, Germany, Sep. 17-19, 2001, mentions a situation where two turbines are located one behind the other in the wind direction. The downstream turbine has a loss in production because it is in the wake of the upstream turbine. In the article it is proposed to place the upstream turbine at an angle so that the wake is deflected and just flows (partially) past the downstream turbine. This turbine is now no longer (or to a lesser extent) in the wake and therefore produces more. The authors state that active control of the angles of inclination at which wind turbines are placed could yield an advantage for maximising the production of the farm as a whole. This is then achieved by steering the wake of turbines located upstream away from turbines located downstream. Shadow effects are reduced to some extent by means of this measure, but, because the wake still remains in the farm, in the case of a large farm exhaustion of the boundary layer will nevertheless take place and the shadow losses will essentially still exist.

The publication entitled 'Optimal Control of wind Power Plants' in Journal of Wind Engineering and Industrial Aerodynamics, (27), Amsterdam, 1988, describes that the operation of upstream wind turbines of a farm with a blade tip speed lower than that at which the maximum amount of energy is extracted can lead to a rise in the total farm production. No physical explanation is given for the result confirmed by simulation.

In the thesis entitled 'Flow Separation on Wind Turbine Blades', ISBN 90-393-2592-0, 8 Jan. 2001, it is stated that kinetic energy is lost during mixing of the slow wake air and the fast non-wake air. In the case of a solitary wind turbine that is running at optimum operation the mix loss is 50% of the power generated by the turbine, so that the kinetic energy that a wind turbine extracts from the flow is not equal to the energy generated but is one and a half times as much. In this publication it is also proposed to allow the upstream turbines in a wind farm to extract less than maximum energy from the wind. As a result the production by the turbines upstream decreases slightly, whilst the mixing loss decreases substantially, so that the wind speed further into the farm will drop to a lesser extent and the downstream turbines will start to produce more. The intention is that the increase in production by the downstream turbines is greater than the decrease in production by the upstream turbines. The present invention relates to this mixing of air flows.

For large farms all the above measures are regarded as drops in the ocean. Experts consider the shadow effect to be a given situation with which wind energy is confronted. The turbines extract the energy from the lowermost layer of the atmospheric boundary layer and the speed in that layer will inherently drop as a result.

Shadow effects have already been studied for 20 years and on 23 May 2002 twenty experts, some who have been working on this topic since 1980, exchanged their most recent information during a meeting at Rise National Laboratory, Denmark. All attention is focussed on modelling the shadow effects. Specifically, it has been established that the effects are large, but not how large they are and what precisely determines them. By improving the modelling it can be estimated more accurately in advance how much a large farm in a specific position will produce. This information is, of course, extremely relevant to investors. During the meeting shadow effects were nevertheless regarded as unavoidable and specifically to the extent that the question as to whether shadow effects could possibly be (partially) prevented was not even raised, as can be seen from the minutes.

The study entitled 'Samenvatting technisch onderzoek SEP-Proefwindcentrale', ('Summary of technical study on SEP Test Wind Power Station'), Kema-Industriële energie systemen, Amhem, November 1994, in which the following conclusion is drawn; 'increasing production with a farm control system by taking account of wake interaction does not appear to be feasible' is further confirmation of this view within the wind energy sector.

To summarise, the problem of the shadow effect is that it gives rise to substantial falls in production, that placing wind turbines further apart is a remedy that leads to high costs (greater cable length and, on land, longer roads) and to a low power per unit surface area. Because space is scarce, this is a major disadvantage. Not only can less be generated on a given surface area, but many areas will also lose out in competition with other purposes if only low production is to be expected. The prevailing view is that although the problem can be better modelled it cannot be solved.

Nevertheless, unexpectedly, a partial solution is provided by means of the present invention. The invention relates to assemblies by means of which energy is extracted from flowing air or flowing (sea)water. The assembly will be in a boundary layer that has the characteristic that the fluid speed is low close to the wall and increases with increasing distance from the wall. The assembly generates flows or circulations upstream (wind direction) such that fast fluid from a greater distance away from the wall is now guided towards the wall and slow fluid from close to the wall is guided away from the latter. The flows generated will now, as vortex generators, increase the speed of the fluid close to the wall. The generation of these flows is effected by the so-called guiding devices that can be either passive or active and that can also take energy from or supply energy to the fluid. By correct adjustment of the flows in the rest of the assembly the fluid speed at the location of the energy-extracting devices of the assembly will now increase, so that more energy can also be produced. If the assembly consists of a number of energy-extracting devices, one after the other, the flows also function to guide the wake of the energy-extracting devices away, which can lead to a further increase in production. The energy-extracting devices together are also termed farm or assembly below, in which context it must be understood that the energy-extracting devices can also be guiding, but that the farm can also contain devices that are exclusively guiding. Such a farm can be either in the atmosphere or under water. If the assembly consists of a number of energy-extracting devices regular distances apart and of a further group of guiding devices located a greater distance away, the first group is then termed the farm and the further group is located outside this. Thus it is possible to refer to positions inside the farm and outside the farm. Furthermore, the term farm is also used to refer to the volume within which there is fluid from which energy is extracted, without the present invention necessarily having to be used at every point therein. In other words, the volume around the farm within which exhaustion of the kinetic energy occurs to a significant extent. We can also refer to the width and the length of the farm. The width is measured perpendicularly to the dominant flow direction of the fluid and the length in the dominant flow direction. The width or length is always the greatest width or length measured between various devices in the farm. The farm surface area follows simply from the product of length and width. If we add up all surface areas that are occupied by energy-extracting devices inside the farm (in the case of two horizontal shaft turbines with a diameter of 100 m the surface area occupied is $2 \cdot \pi/4 \cdot 100^2$ m$^2$) we have the total surface area occupied by the farm. Usually this surface area occupied makes up a small percentage of the farm surface area, for example approximately 5%. By employing the present invention, which becomes increasingly more advantageous the larger a farm becomes, the said percentage will be able to increase, especially in larger farms with, for example, more than 20 turbines, to above 5%, 10% or even 20%.

In a particular embodiment the wall can be compared with the surface of the earth, that is to say land or sea (water), the assembly with a wind and both the energy-extracting and the guiding devices with wind turbines and the flows with circulations. The circulations can already be generated with a number of turbines in front of the farm by placing the turbines vertically or horizontally at an angle to the wind. As a result a horizontal and/or vertical lateral force is produced on the air flow, such that flows are produced that guide the slow air from the lowermost layers in the atmosphere away and guide fast air downwards. The wind speed in the farm and especially at the location of the wind turbines that extract energy increases, as a result of which production increases. Other embodiments of such assemblies are underwater turbines that extract energy from flowing water. Such flowing water can be a flowing river, a tidal flow and any other water flow found on earth from which energy can be extracted. With these assemblies as well lateral forces are exerted on the flow so that slow flow is guided away from the energy-extracting devices and fast flow is specifically guided through said devices.

In general, one aim of the invention is to feed fast fluid flows that are not too far away from the assembly through the energy-extracting devices. In the particular case of wind farms or water turbines that are on the bed of water flowing above it, the fluid flow will increase with increasing height above the turbines and fluid guiding will have to take place in such a way that fluid from a greater height is guided downwards. The faster fluid can also be lateral with respect to the assembly (or part of the assembly). For example, in complex terrain it can be the case that some of a fast wind blows specifically alongside wind farms. In these cases the guiding devices of the assembly can be so set that the fast fluid is deflected sideways and is thus guided through the energy-extracting devices. In the case of an energy-extracting assembly in a water flow it is also conceivable that a fast fluid flow is underneath the assembly. For example, if the assembly is constructed such that it floats and is in the upper part of a flowing river or tidal stream. In these cases the guiding devices are so set (which is also to be understood to mean in respect of the position) that slow fluid is guided away from the energy-extracting devices of the assembly and fast fluid is guided specifically through these devices. Furthermore, it must be understood that some of the devices, such as wind turbines, can have both an energy-extracting and a guiding function. In particular the device is a wind turbine which, as is known, is able to extract energy from the flow but, moreover, if it is positioned at an angle to the flow, is suitable for deflecting the flow vertically or horizontally aside. One aim that is targeted is that the assembly is so set that shadow losses decrease for the entire assembly. It is possible that some energy-extracting devices are subjected to a greater shadow loss, but it is always the case that the yield (determined according to production and loads) of the assembly as a whole increases.

Wind turbines or water turbines extract the maximum amount of energy from a fluid if the fluid is retarded at the location of the turbine to approximately $2/3$ of the original speed and to $1/3$ approximately 1 diameter of the turbine behind the turbine. The decrease in speed of $1/3$ of the original speed at the location of the rotor is termed the axial induction, which is designated by the letter a. In the case of maximum energy extraction a is $1/3$. By choosing a value of less than $1/3$ for the axial induction the turbine retards the wind to a lesser extent and the turbine concerned extracts less energy from the wind, which according to the state of the art can be beneficial for the turbine located behind it. If, however, a turbine is used as a guiding device, according to a preferred embodiment of the present invention the axial induction is set to values higher than $1/3$. The wind turbine then exerts a greater force on the wind than that at which the maximum amount of energy is generated. This can be advantageous for the rest of the assembly. Turbines where the induction factor is set to negative values of a also constitute a preferred embodiment. A negative value of a means that the wind speed at the location of the turbine specifically increases because the turbine is driven and supplies energy to the fluid. This special situation can be advantageous in order to guide the fluid away in a manner such that the costs associated with this are lower than the benefits for the rest of the assembly.

The fluid-guiding devices of the assembly can form part of a group of energy-extracting devices arranged next to one another (in particular a wind farm), but can also be arranged some distance away from such a group. One advantage of this can be that flow guiding has taken place even before the flow impinges on the energy-extracting devices. As a result a slow fluid flow that without guiding would have flowed through the group of energy-extracting devices can now be guided away and replaced by a fast fluid flow, from which, of course, more energy can be extracted. In particular, this embodiment is advantageous in boundary layers where the speed of the fluid flow essentially increases with the distance from the wall. More particularly, this concerns the atmospheric boundary layer in which a wind farm has been positioned. The turbines are fairly low in the boundary layer and consequently have an appreciably lower supply of wind than they would experience at a greater height. By now, in accordance with a preferred embodiment of the invention, placing guiding devices (in particular wind turbines) upstream of a wind farm, the wind from a greater height can be guided downwards and through the farm. Incidentally, the flows that are generated upstream will continue into the energy-extracting part of the assembly, so that they are still effective in this location as well as a result of guiding wake fluid away and guiding fast fluid from a greater distance away from the assembly through the assembly. The guiding devices some distance away from the energy-extracting group are preferably arranged upstream of this group. In geographical locations where there is a strongly dominant wind direction, the guiding devices can be installed in a fixed position. In the particular case of offshore wind energy the guiding devices can also be of mobile construction, for example floating. By moving the devices these can always be kept on the upstream side of the farm.

The assembly referred to in the invention will generate flows, or in other words eddies or circulations, as a result of which fast fluid is guided through the farm and slow fluid (in particular wake fluid) is specifically guided away from the latter. The distance over which this exchange of fast and slow flows can take place is limited and depends on, inter alia, the size of the assembly. The larger the assembly, the more easily can a large-scale circulation be generated and the greater the yield that such a large-scale circulation possesses. In the particular case of wind farms the distance over which fluid can be guided laterally is at least limited by the height of the atmosphere (effectively approximately 10 kilometres). However, the atmosphere usually consists of an unstable part (the bottom 1 to 2 km) and a stable part above this. There is stratification in the stable part and it is difficult to generate air flows in the vertical direction. Therefore, the scale of the circulations that are relatively easy to generate is further restricted to approximately 1 to 2 km in the case of wind farms. The boundary layer in which wind farms are located will be of the order of a number of times the turbine height. In the case of turbines 150 metres in height, in a large farm an appreciable exhaustion of the boundary layer will occur up to, for example, 2 to 6 times the height (300 m to 900 m). The larger the farm, the greater is this exhaustion height. A further aim of the present invention is to guide fluid from above this exhaustion height downwards and conversely to guide fluid of low speed (far) upwards. In the case of a small farm with small turbines a scale of circulation according to the invention of the magnitude of half a turbine diameter is already functional. In the case of a large farm the scale of circulation can rise to many turbine diameters.

Once a circulation has been generated this will disperse again only over a relatively large distance. The generation of the (large) circulations is expensive in the sense of investment in the device of additional guiding devices or in the sense of a reduction in the production because energy-generating devices also acquire a guiding function. It is therefore also sensible to make good use of a circulation once this has been generated. The circulation will move in the main direction of flow, which is one reason for allowing a wind farm to extend in the same direction. This is a surprising conclusion because to date wind farms have specifically preferably been positioned perpendicularly to the dominant wind direction, whilst according to the invention a farm can also advantageously send in the dominant wind direction. In an advantageous embodiment according to the invention fast fluid from a greater distance away from the wall is even guided so effectively to the energy-extracting devices that the fluid speed is able to increase rather than decrease passing through the farm in the main direction of flow. There could be said to be negative shadow losses.

On earth the wind direction is essentially determined by the high and low pressure areas and by the rotation of the earth. As every expert in the field knows, the wind veers to the left in northern hemisphere and to the right in the southern hemisphere. In free flow two equal and opposing forces located in the horizontal surface of the earth act on the wind, perpendicularly to the wind direction: the force resulting from the pressure gradient and the Coriolis force. The law is proportional to the wind speed. If the wind speed now drops, for example because kinetic energy is extracted therefrom, the Coriolis force proportional to the wind speed will decrease. The pressure gradient is now stronger than the Coriolis force and therefore the wind will accelerate in the direction of the pressure gradient. In the northern hemisphere the slow air consequently veers to the left compared with the air that has not been retarded; in the southern hemisphere it veers to the right compared with the air that has not been retarded. According to a preferred embodiment of the invention, guiding wake air away and attracting fast air is carried out in such a way that the natural veering of wake air described above is intensified. In a further preferred embodiment the turbines that have a guiding function turn anticlockwise in the northern hemisphere and clockwise in the southern hemisphere because what is then achieved, certainly in combination with cyclic blade angle adjustment is that the wake air at the lower side is pushed even more intensively in the direction in which it already naturally goes. The direction of rotation is then defined for an observer who is looking at the pressure side of the turbine. More generally it is proposed to select the direction of rotation of the guiding turbines in such a way that the wake rotation, which is the consequence of the rotor torque, also again assists the targeted circulations so as to guide slow fluid away from energy-extracting devices and to guide fast fluid through these.

The assembly that is operated according to the invention will be subject to less shadow loss than an assembly according to the state of the art. Because the traditional way of limiting shadow losses consists in increasing the distance between the energy-extracting devices (in particular wind turbines) a farm thus becomes more expensive and results in a less efficient utilisation of the surface areas. By employing the present invention, a farm can be designed more compactly, whilst the shadow loss remain acceptable. Common distances in the dominant wind direction between energy-extracting devices are approximately 5 to 10 times the characteristic size of such a device (in particular: in the case of a wind turbine the distance between turbines is 5 to 10 times the rotor diameter). By employing the invention this distance can preferably be reduced to, in general, less than 5 times the characteristic size, more particularly 4 times and even more particularly 3 times the characteristic size. The characteristic size is defined as the square root of the product of $4/\pi$ and the surface area occupied by au energy-extracting device. In the case of a horizontal shaft turbine this is the diameter.

In the above text on the present invention the general terms 'energy-extracting device' and 'gliding device' are used to refer to any assembly that is able to perform these functions as known in the state of the art. In particular the devices are turbines that are known both underwater and above water, the turbines are either the horizontal shaft type shaft and the vertical shaft type. In this context it must be understood that the terms horizontal and vertical are only type designations and in practice any position of the shafts is possible. These devices can, as any person skilled in the art understands, furthermore relate to ladder turbines, flying turbines, translating turbines, turbines in combination with concentrating devises such as tip vanes or annular wings, electrostatic wind turbines, zeppelin turbines, turbines with multiple rotors on a tower, groups of turbines, etc. The guiding devices can have all said shapes, also including profiles, wings or sails arranged passively. Existing parts of energy-extracting devices can also be adapted so that they acquire a guiding function. The guiding devices can furthermore consist of flyers, magnus rotors, etc. In particular, assemblies that are able to guide said air flows by changing the density in the flow may also be mentioned. This can be effected by changes in temperature, it being possible for a guiding device to consist of a large black surface that radiates heat from the sun into the air, so that this acquires a lower density and is guided upwards. It can also be effected by introducing water into the air, as a result of which the air cools as a result of evaporation of the water. The density now increases, as a result of which the air will flow downwards.

Further advantage is obtained if the invention according to a preferred embodiment is employed in farms where the energy-extracting devices have been placed in groups next to one another. Because one aim of the invention is to guide the wake away, this is advantageous. Specifically, a device can deflect the flow over a number of times its characteristic size. Especially in large farms the wake must be guided away over a large distance so that it no longer hinders the assembly downstream. Because a group of energy-extracting devices has a larger characteristic size than a single device, such a group can guide the wake away over a greater absolute distance. In the particular case where a wind turbine positioned at an angle to the wind direction is used as guiding device, greater advantage is obtained since a lateral force is also exerted on the air below the rotor. In specialist terms: the circulation that is linked to the lateral force that the turbine exerts on the wind must continue as far as the surface (the ground or the water). This can be achieved in a large number of ways. It is generally known that the rotor blades of turbines are subjected to severely fluctuating loading if a turbine is at an angle to the flow. This can be catered for by providing the rotor blades with cyclic blade angle adjustment. A preferred embodiment according to the invention is construction of the fluid-guiding turbines with cyclic blade angle adjustment. If vertical shaft turbines are chosen for guiding, these can also be provided with cyclic blade angle adjustment, so that this type of turbine as well is able to exert a transverse force on the flow. According to the state of the art slight inclination occurs widely because variations in wind direction are so rapid that the wind turbine is not able to follow them. Furthermore, a rotor usually has a small angle of tilt in order to ensure a greater distance between the blade tips and the tower. As a result of the angle of tilt, the rotor is also at a angle to the wind. For these reasons a rotor is able to withstand angular positioning loads of less than 10° degrees inclination for 20 years. Wind turbines that act as guiding devices in the present invention must be able to cope for angles of inclination of more than 20°, in particular more than 30° and even more particularly more than 45° for years. In a further preferred embodiment of these turbines the blade angle of the blades can be cyclically adjusted at an adjustment rate of more than 6° per half revolution. Guiding the wake aside can be effected by placing the wind turbines at an angle with the capstan assembly. In a preferred embodiment the rotor can also turn in the tilt direction. A large angle of tilt can be functional if the wake has to be guided upwards. More particularly, variable adjustment of the angle of tilt is possible so that the optimum angle of tilt can always be chosen depending on wind direction, wind speed and the position of the turbine in the farm. Of course, it must be understood that the loads on a rotor tilted through a large angle can be reduced again by cyclic blade angle adjustment.

In all the above embodiments the aim has always been to optimise an assembly as a whole. This aim can be further extended to optimisation of a number of assemblies at the same time. In particular it can concern several wind farms, where one farm is partly in the shadow of another farm. By taking account of this situation in the upstream farm, that is to say by having the turbines in this farm guide the flow in such a way that the farm located downstream is subject to less shadow loss. The aim of all the measures summarised above is to increase the fluid speed at the location of the energy-extracting devices, such that the production of the assembly as a whole increases. However, the assembly can also be operated in a different way, where slow fluid is specifically retained within the farm or is guided to the farm, in other words the shadow effect is promoted. This can be advantageous if the fluid speed is higher than that at which the energy-extracting devices achieve their maximum capacity. By promoting the shadow effect the fluid speed drops and the production of the energy-extracting device can increase and/or the loads on said devices can decrease. Further advantage is obtained if the fluid speed can be kept below $V_{cut\ out}$ (cut out speed) by promoting the shadow effect so that the energy-extracting devices can remain in operation.

As has been seen, the optimum assembly and the associated optimum method for extracting energy from the flow depend on many factors. When designing an assembly a great deal of calculation has to be carried out in order to select the various devices in the best way and to install these in the correct positions. This is, of course, a function of the characteristics of the passive or active devices used, of their mutual positions, of the terrain, of meteorological parameters and of a wide variety of other aspects such as financial aspects and insurance aspects. The complexity and the large number of possible solutions give cause to support this design process by means of software. Software having the special feature that guiding devices can be added to the assembly and/or where turbines can have a guiding function and where the influence of said devices on the farm can be predicted is within the range of the invention.

Once an energy-extracting assembly has been described, there are then a large number of associated variables to be selected. The optimum setting of all these variables is difficult to determine in advance. Therefore, software is needed that tests a large number of combinations of settings, optionally based on specific physical insights. According to one embodiment of this software parameters such as the angle of inclination, the scale of circulation, the positions of the devices generating circulation or the direction of the transverse force are varied in accordance with a specific pattern. The performance of the assembly is stored as a function of the parameters that can be set and the optimum is then sought for each wind speed and wind direction. Other meteorological data such as the temperature distribution or the stability of the atmosphere also occur as parameters in this context. Starting from a local optimum found, parameters are changed time and again in order to find a better optimum. The program can be self-learning and thus able to control the assembly in an ever better manner. In this way in the course of time a good picture of the control strategy is obtained and a database is compiled that, in turn, can be functional for the adjustment of other energy-extracting assemblies. Using this knowledge it is also possible to improve the design process for new assemblies.

The invention is preferably employed in wind farms by arranging certain wind turbines at an angle. It is known to every person skilled in the art that this is disadvantageous for those turbines that have not been designed and constructed for this physically more severe load. Because wind turbines set up at an angle would usually be immediately rejected as a preferred set-up by a person skilled in the art, the invention is not obvious. According to initial rough estimates, the present invention can yield an increase in production of a few percent for smaller farms and this can be terms of percent for larger farms. In an extreme embodiment, the wind speed in a farm even increases in the wind direction. Further advantage is obtained because farm can be of more compact construction, as a result of which the infrastructure required for the farm can remain restricted: shorter cable length and, on land, furthermore shorter roads and, both on land and on water, shorter travelling distances. Because a higher production per unit surface area is obtained, the application of the invention can enable wind energy to compete better with other applications, as a result of which, apart from a higher production per unit surface area, furthermore more space becomes available for farms. To summarise, the commercial value of the invention can be high.

Further characteristics and features will be described with reference to the drawings of various embodiments according to the invention.

FIG. 1 shows a wind farm 1 with the dominant wind direction 2 indicated in the figure. If the farm is operated and/or laid out according to the invention the loss as a result of shadow effects will be less than normal.

FIG. 2 shows the section I-I of the farm FIG. 1 according to the invention in which it can be seen that turn and turn about there are rows of turbines that guide the wake alternately to the left 5 or the right 6. As a result the circulations 3 are produced, as a result of which the wakes 7 of the turbines are guided upwards and the fast wind from greater height 8 is guided downwards. The circulations are generated by wind turbines which exert a lateral force on the wind on the windward side of the farm.

FIG. 3 shows a side view of a row of turbines from the farm in FIG. 1 that is operated in accordance with the state of the art. Wind direction 10 is the prevailing wind direction at that point in time. The speed profile 11 of the undisturbed atmospheric boundary layer will change to profile 13 moving along with the wind direction. Line 7 shows the direction of flow of the wakes. Lines 9 delimit the flow from which the farm has extracted energy.

FIG. 4 shows the same side view except that the invention is employed. Counting from the windward side, the first three turbines 5 are at an angle to the wind, as a result of which the wind is deflected to the left. As a result a circulation is produced that guides wind from above 8 through the turbines which are located further towards the lee side. The farm now extracts energy from the atmosphere up to a much greater height, as can be seen from the top line (9) that is much higher in FIG. 4 than in FIG. 3. The turbines at an angle on the windward side can be regarded as vortex generators in the atmospheric boundary layer.

FIG. 5 shows a section II-II of the row of turbines (horizontal shaft type) in FIG. 4. Here the circulation 3 can be seen that has been generated by the upstream turbines and that guides wake air 7 upwards via a lateral movement and simultaneously guides fast air from above 8 downwards.

FIG. 6 shows the wind farm 1 according to the invention where each circulation 3 encompasses several rows of turbines. The height 4 of the circulation will be greater than that in the case of FIG. 2. The larger a wind farm the further and higher will be the circulations that can be generated. As the farm becomes larger, a greater circulation will also be needed to prevent wake air that was produced on the upstream side from returning too quickly to the farm. In FIG. 6 turbines (14) can also be seen that guide the wake upwards. The scale of circulation can be defined on the basis of the following example. Assume that circulations 3 are generated above a wind farm as is shown in the figure; flows 7 away from the farm are then produced and flows 8 towards the farm. The distance between flows 7 or 8 in the same direction, between which there is an opposing flow, is now termed the scale of circulation. Overall this distance is approximately equal to the distance between the vertical arrows 7 and 8 in the drawing.

Figure 7:
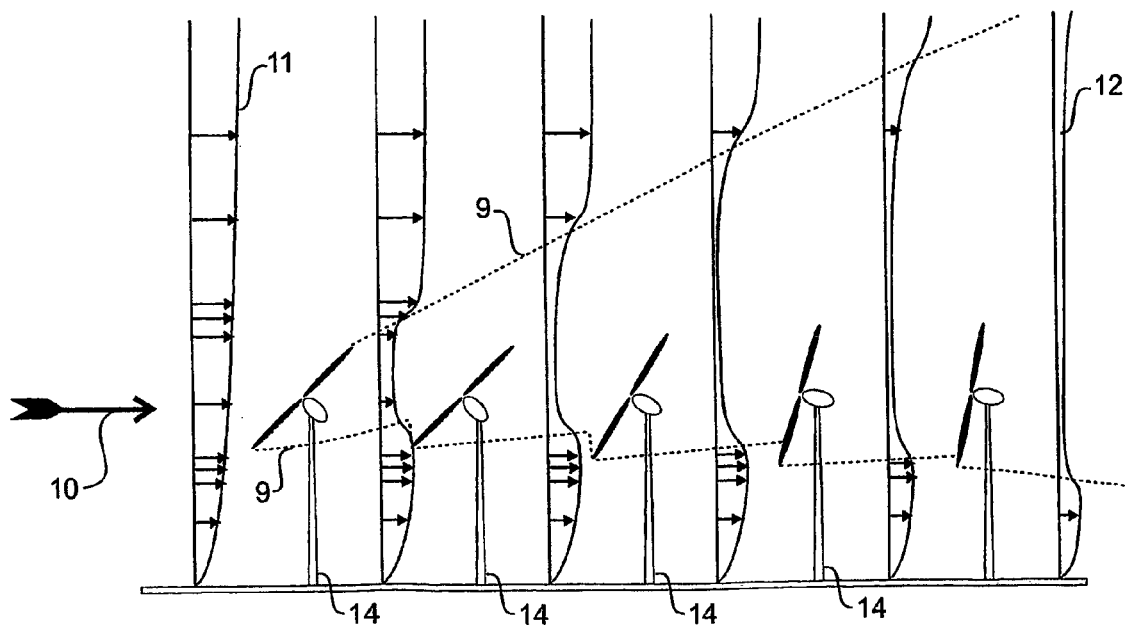

FIG. 7 shows a side view of the row of turbines in farm 1 from FIG. 6 where the wake is guided upwards according to the invention by turbines 14 to windward. Guiding upwards is achieved by the large angles of tilt of the turbines 14. The top line 9 that delimits the area within which a large amount of energy is extracted from the wind is once again at a much greater height compared with the situation in FIG. 3 that describes the state of the art. The higher line 9 the better is the farm able to extract energy from air flows at greater height.

FIG. 8 shows the vertical steering of the wake according to the invention in detail. Because turbine 14 to windward has a large angle of tilt, the wake 7 delimited by contour 9 is guided upwards and fast air from above 8 will replace it. As a result downstream turbine 15 will receive more wind and will therefore produce more.

FIG. 9 shows section III-III from FIG. 8. The wake 7 delimited by contour 9 flows upwards, as a result of which the wind from above 8 flows downwards and turbine 15 produces more.

FIG. 10 shows a wind farm 1 by means of which a large circulation flow is generated according to the invention. All upstream turbines and those further into the farm 5 (not all provided with a number) guide the flow to the left. In the northern hemisphere retarded (wake) air will automatically veer to the left as a result of the atmospheric pressure gradient that, as a result of the retardation, is no longer in balance but is greater than the Coriolis force. Consequently, in the northern hemisphere guiding wake air to the left is preferred. The circulation is already generated on the windward side in the farm; therefore the turbines to windward are at the greatest angle and the inclination decreases in the direction of flow go through the farm. The downstream turbines 15 no longer have to assist in the circulation because it is no longer important what happens behind them. These turbines therefore face directly into the wind in order to produce as much as possible.

FIG. 11 shows the section IV-IV of the farm from FIG. 10. The wake 7 of the turbines is guided sideways so that a circulation 3 is produced that once again feeds fast air from above 8 into the farm, as a result of which the production rises.

FIG. 12 shows a wind farm 1 according to the invention in which the wake is guided to either side of the farm by the turbines placed at an angle. Turbines 5 guide it to the left and turbines (6) guide it to the right. Only the turbines (15) on the leeward side no longer contribute to the circulation. In FIGS. 10 and 12 it can be seen that the turbines downstream in this farm are facing directly into the wind and are intended to extract a large amount of energy from the wind and no longer to contribute to the generation or the maintenance of the circulations that guide fast fluid from a great height downwards. Specifically, this no longer serves any purpose unless another farm should also be located on the lee side of the arms drawn. In these cases it is sensible to make even the turbines 15 indicated in FIGS. 10 and 12 contribute to guiding so that the wake is guided away and fast fluid is guided through the farm to leeward.

FIG. 13 shows section V-V from FIG. 12. Two circulations 3 turning towards one another have been produced by the pattern in which the turbines in the farm have been inclined. In this embodiment the wake air 7 is driven sideways out of the farm and fast air 8 from above is brought in.

FIG. 14 shows, according to the invention, a combination of a wind farm 1 and a floating body 16 on which two turbines 5 have been placed that exert a force to the left on the wind, as a result of which the wake is deflected to the left. Because the wind direction varies, the floating body will be moved depending on the wind direction so that it is always to windward. The two turbines on the floating body generate a circulation on the windward side even outside the farm. As a result the slower air at the bottom of the atmospheric boundary layer will move upwards and the faster air from above will be guided downwards. Time is needed for this process and therefore the turbines 5 are also positioned upstream with respect to the farm. The advantage now consists of two effects: guiding away the wakes of the turbines in the farm and exchanging the slow air at the bottom of the atmospheric boundary layer with fast air even before the wind reaches the farm.

FIG. 15 shows the section VI-VI of the assembly in FIG. 14. The circulation 3 that has been generated by turbines 5 on floating body 16 can be seen in this figure. This circulation has already caused a sort of inversion in the section from the floating body to the farm, as a result of which fast air from a great height has been guided downwards, which gives rise to more production in the farm and, supplementing this, the wake of the turbines in farm 1 is guided away and fast air 8 is brought in continuously as a result of the circulation.

FIG. 16 shows the same situation as in FIG. 14, but the two turbines on the floating body 16 now steer in opposing directions. Turbine 5 steers to the left and turbine 6 to the right. In this way two opposing circulations are generated according to the invention.

FIG. 17 shows section VII-VII from FIG. 16 is comparable with FIG. 15. The difference is that two circulations 3 are generated and that fast air 8 now flows from above downwards in the middle of the farm. The wake air 7 is guided away at both sides of the farm.

FIG. 18 shows a wind farm 1 according to the invention with two profiles 17, which generate circulations, upstream outside the farm. So as always to keep the profiles upstream with respect to the farm, these are installed on floating bodies 16 such that they are mobile. The profiles deflect the wind 10 sideways along paths 18. The circulation generated as a result once again provides for exchange between the slow air from the atmospheric boundary layer and the faster air at greater height, so that the wind speed in the path between the profiles and the farm increases at the location of the turbine rotors in farm 1. The second function of the circulation is to guide the wake away sideways and to attract fast air from above.

FIG. 19 shows the section VIII-VIII from FIG. 18. The passively installed profiles 17 that exert a lateral force on the air flow, which consequently is deflected in accordance with the arrows 18 and as a result of which circulations 3 are produced, can be seen from this figure. At the location of the turbine farm 1 the wake is guided sideways and an inflow of fast air from above 8 is produced.

Figure 20:
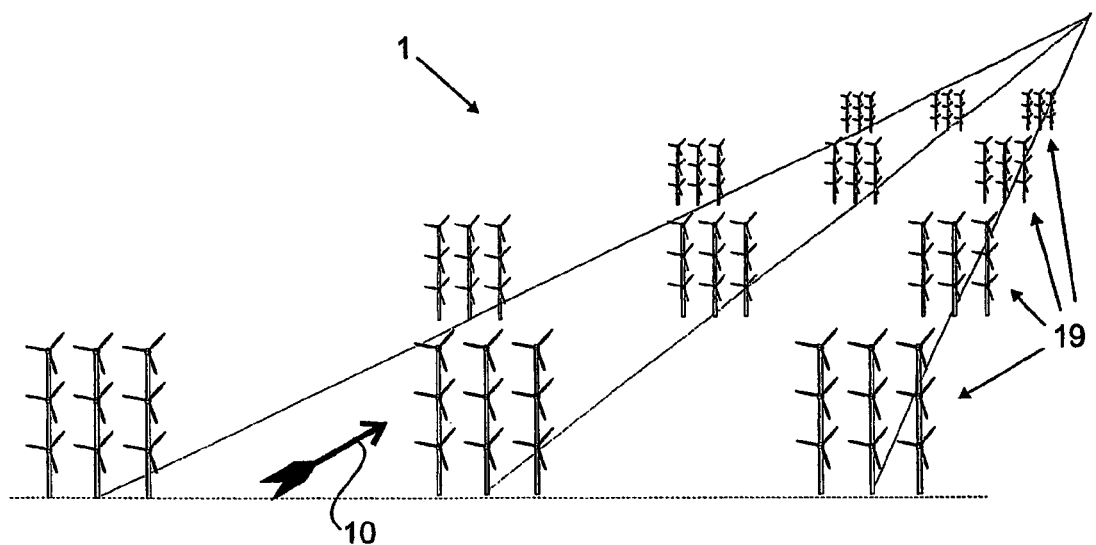

FIG. 20 shows a wind farm 1 that is made up of groups of turbines 19. Within a group the turbines are close to one another; as a result a group effectively behaves as one larger turbine and the wake can be moved laterally or upwards over a greater absolute distance. If the wake can be guided further away, the downstream turbines will be subject to less hinder.

Figure 21:
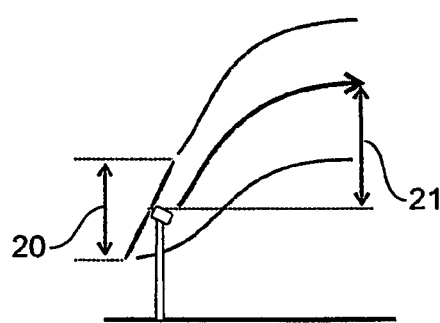

FIG. 21 shows a single turbine with a size 20 that steers the wake upwards over a distance 21.

Figure 22:
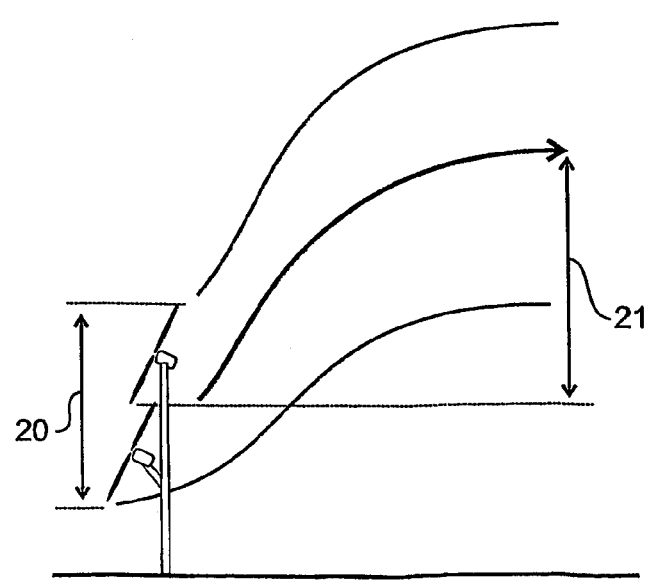

FIG. 22 shows a group of turbines with several rotors on a tower, which according to the invention behaves as a single larger turbine with effective size 20 and steers the wake upwards over a distance 21. On the whole the ratio between the lengths 21 and 20 is the same in FIGS. 21 and 22. In absolute terms, however, the distance over which the wake is moved is greater in FIG. 22, as a result of which the wake can be steered over greater distances. The higher the wake is guided away, the less will be the extent to which the downstream turbines hinder: the layer in the atmosphere within which the speed drops as a result of energy extraction by the turbines is thicker and therefore more energy can be extracted.

Figure 23:
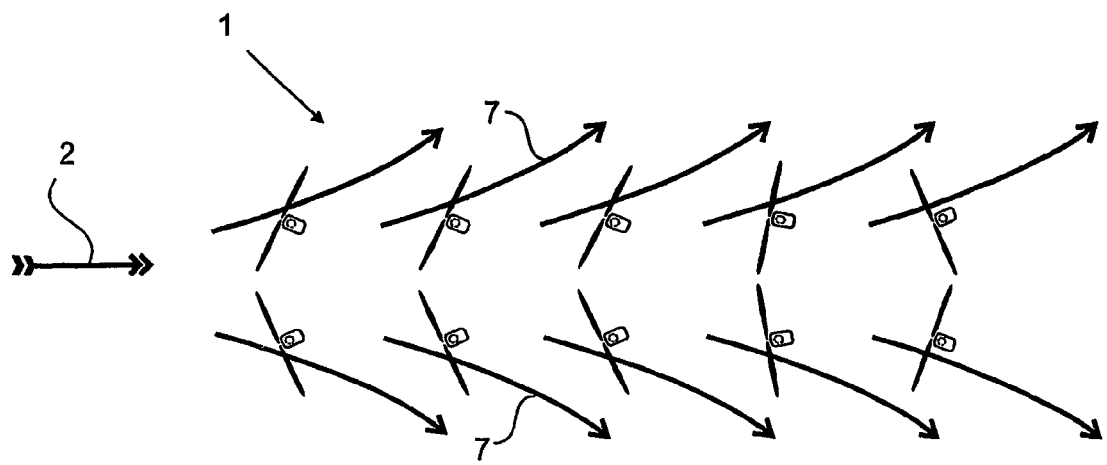

FIG. 23 shows a wind farm 1 according to the invention which has the characteristic that it extends in the dominant wind direction 2. Such a farm has also already been shown in FIG. 1. Usually, lower production is expected if a set-up in the dominant wind direction is chosen, because the shadow effect is greater than in the case of a set-up that extends perpendicularly to the dominant wind direction. If, however, the method of the invention is employed the wind speed can in fact increase (or decrease to a lesser extent) with the distance in the farm and a wind farm that extends in the dominant wind direction can in fact produce more than a conventional farm. An additional argument is that the generation of the circulations 3 is at the expense of some production because the upstream turbines generate less energy as a result of the inclination. However, less effort is expended to maintain the circulations and they therefore have a beneficial effect in the direction of flow over a longer distance. Therefore, a farm can extend in the dominant wind direction.

Figure 24:
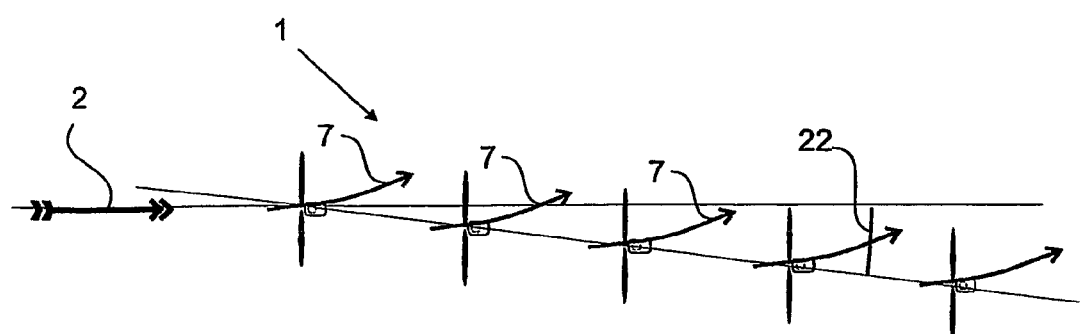

FIG. 24 shows another preferred embodiment according to the invention of a farm in the northern hemisphere. In this farm account has been taken of the 'natural' veering of the wake 7 to the left in the northern hemisphere, which occurs even if the turbines are not at an angle. By having the farm make an angle 22 with the dominant wind direction 2, the shadow effect is further prevented.

Figure 25:
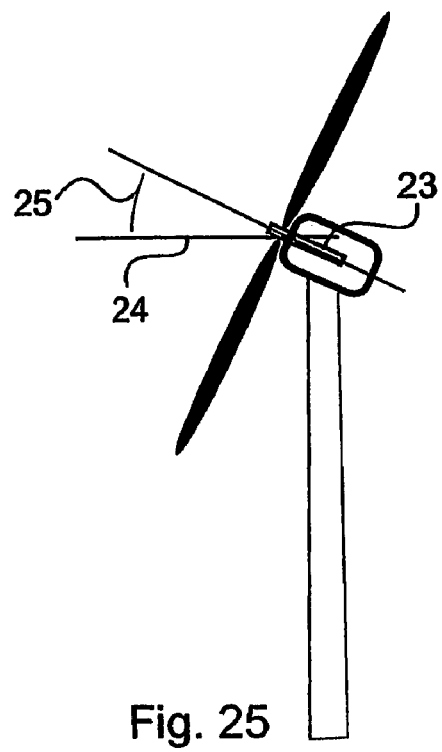

FIG. 25 shows a wind turbine with an exceptionally large angle of tilt 25, which is defined as the angle between the horizontal 24 and the axis of the rotor of a horizontal shaft turbine 23. The large angle of tilt makes it possible to steer the wake upwards, as shown in FIGS. 8 and 21 and as can be functional in order to reduce the shadow effect according to the invention.

Figure 26:
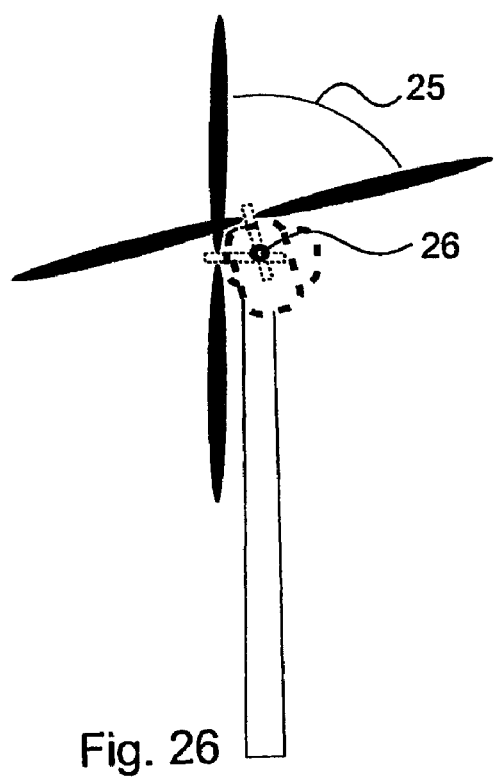

FIG. 26 shows, according to the invention, a wind turbine with a variable angle of tilt. If there is little wind it can be desirable to steer the wake severely upwards, so that a large angle of tilt is needed, whilst in the case of a lot of wind a small angle of tilt can be best. The ideal angle of tilt is also dependent on the wind direction and on the position of the turbine in the farm. Therefore, a variable angle of tilt enables better farm control (with less interference between the turbines).

FIG. 27 shows two rotor 28 on a single tower, which according to the invention is an advantageous combination for generating circulations in a farm. A single rotor on a tower that is at an angle to the wind will generate two eddies turning towards one another. These eddies are not effective a greater distance away because they cancel each other out. In order to obtain more effect a greater distance away the eddies turning towards one another must be a larger distance apart. This is achieved by installing two rotors 28 on a tower, both of which are inclined. By this means circulations that carry wake away and feed in fast air from above the farm are generated more effectively. With this arrangement a lateral force as far as the ground or the water surface is preferably produced. As a result the circulation, which is linked to the lateral force that the turbine exerts on the wind, continues as far as the ground or water surface.

FIG. 28 shows a side view of the assembly in FIG. 27. Two rotors 28 are mounted on the tower 27, which rotors together are able to generate the circulations more effectively.

FIG. 29 shows, according to the invention, another embodiment of the wind turbine with which two eddies towards one another can be brought a large distance apart. In this case this is effected by fitting a profile 29 around the tower 27 by means of which a lateral force can be exerted on the wind. Although a special embodiment has been drawn here, those skilled in the art must understand that any embodiment with which a transverse force can be exerted on the flow is sufficient and any adaptation of assemblies in order to achieve this falls under the invention.

FIG. 30 shows the section IX-IX in FIG. 29, in which the profile 29 around the tower 27 can be seen once again.

FIG. 31 shows the conventional vertical shaft turbine 30 with, according to the invention, the special characteristic that a lateral force can be exerted on the wind. This is effected by cyclic adjustment of the blade angle of the turbine blades 32, whilst the blades rotate in accordance with the path 31.

FIG. 32 shows the vertical shaft turbine in accordance with the section X-X. The blades 32 are shown at twelve locations in a revolution to show how the blade angle is cyclically adjusted in a revolution so that the wind 10 is deflected in accordance with the arrow 7. A vertical shaft turbine can therefore also be used to counteract shadow effect or precisely to promote this, provided the turbine has cyclic blade adjustment.

Figure 33:
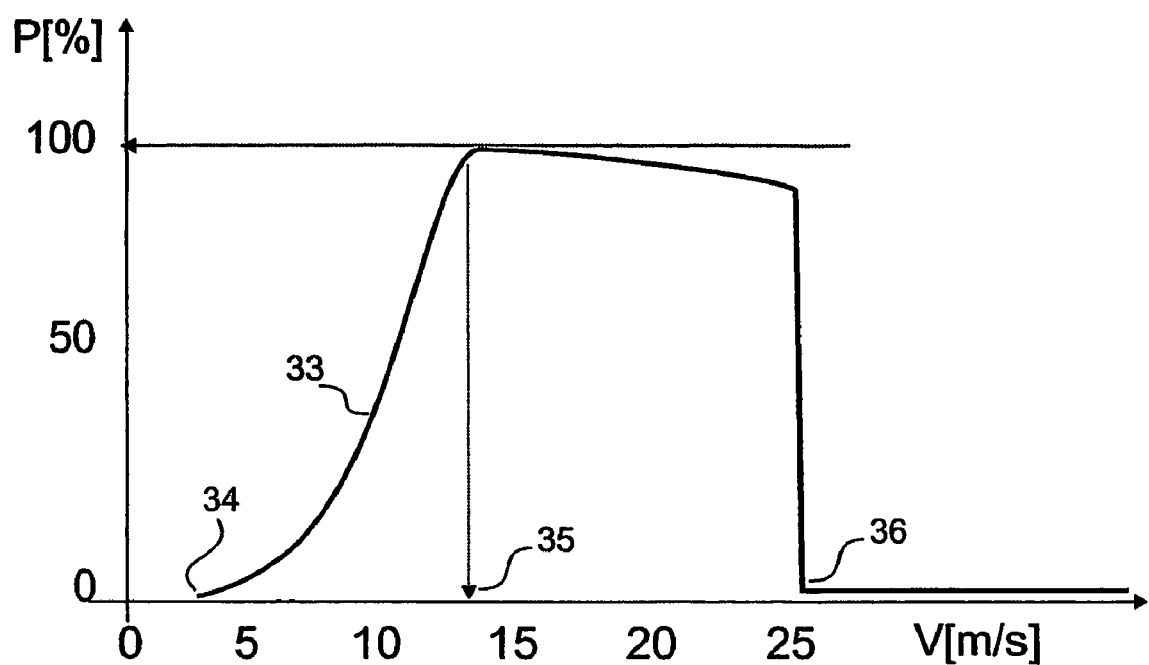

FIG. 33 shows a graph with the curve 33 that shows the change in the generated power P with the wind speed V. Power is first generated at a low wind speed of approximately 3-4 m/s; this is the 'cut-in' wind speed 34. The power then rapidly increases until the maximum power is reached at the nominal wind speed 35. Usually this occurs between 10 and 15 m/s. Many turbines are stopped at a specific 'cut-out' wind speed 36 to prevent overloading. If the wind turbine within a farm is on the curve in the section between 34 and 35 it is sensible to prevent the shadow effect according to the invention. However, if the wind speed is above the nominal wind speed, more wind does not produce more power but possibly even less. If the curve 33 drops in the section between 35 and 36 it can therefore be sensible according to the invention to promote the shadow effect in this wind speed range. The wind speed at the location of the turbine then drops, as a result of which the production increases. An extreme example according to the invention is that the wind speed is somewhat higher than the 'cut-out' wind speed, so that the farm is thus at a standstill. In this case by promoting the shadow effect the wind speed could in fact come below 'cut-out' and the farm can thus come into or remain in operation. The farm then passes from standstill and no production to a state of full operation and high production.

Although the invention has been described above with reference to preferred embodiments, it will be immediately apparent to a person skilled in the art that the advantage can also be achieved in a large number of other ways that fall within the scope of the appended claims.

In the drawings a number of devices have been indicated by a number, the definition of the number is given in the legend below:
1. wind farm
2. dominant wind direction. The arrows 2 in the figures that indicate the dominant wind direction must be regarded as wind vanes, that is to say the wind comes from the direction to which the arrow points.
3. circulation
4. circulation height (a maximum height from which air is guided into the farm)
5. turbines that deflect wake moving in the direction of flow to the left
6. turbines that deflect wake moving in the direction of flow to the right
7. wake flow
8. fast flow from above
9. limit of the flow from which the farm has extracted the energy
10. the 10 minute average wind direction at the location of the arrow
11. undisturbed speed profile
12. speed profile such as can arise according to the invention
13. speed profile according to the state of the art
14. turbines that guide the wake moving in the wind direction upwards
15. turbine to leeward
16. floating body that can be moved
17. profile installed outside the farm
18. air flow deflected by profile
19. group of turbines
20. effective width
21. distance over which the wake is moved
22. angle between line set-up and dominant wind direction
23. rotor shaft
24. horizontal
25. angle of tilt
26. tilt joint
27. tower
28. rotors
29. profile
30. vertical shaft turbine (VST)
31. rotary movement
32. blades of VST
33. plot that shows the power as a function of the wind speed
34. 'cut-in' starting wind speed
35. nominal wind speed
36. 'cut-out' stopping wind speed
37. wind turbine

The invention claimed is:

1. Method for extracting energy from a flowing fluid, using an assembly of energy extracting devices positioned close to one another, a guiding device of said assembly being set with respect to said fluid flow in such a way that additional flow results having forces with a component perpendicular to the undisturbed direction of flow are exerted, such that a flow with higher kinetic energy or with lower kinetic energy, compared with a situation in which said force component is lacking, is guided through an energy-extracting device of the assembly, said flow being effective for at least energy extracting devices, wherein at least one guiding device is a horizontal shaft turbine, the rotor shaft of which makes an angle of more than 5 degrees with respect to the undisturbed direction of flow.

2. Method according to claim 1, wherein the ratio between the generated force component perpendicular to and that parallel to the undisturbed direction of flow is more than 0.1.

3. Method according to claim 1, wherein several guiding devices cooperate in the generation of the same circulation, such that the strength or the scale of the circulation increases.

4. Method according to claim 1, wherein one device of the assembly is operated with an axial induction a greater than ⅓ or less than zero.

5. Method according to claim 1, wherein said guiding device is moved.

6. Method according to claim 1, wherein the guiding device has blades that are cyclically adjusted.

7. Method according to claim 1, comprising several guiding devices, wherein guiding by said devices is such that wakes from energy-extracting devices are bundled by steering them towards one another so that mixing losses are limited.

8. Method according to claim 1, wherein several turbines on a common support together have a guiding function.

9. Method according to claim 1, wherein guiding is such that slow fluid is guided to the left in the northern hemisphere and to the right in the southern hemisphere.

10. Method according to claim 1, wherein the fluid guiding takes place on the upstream side of the assembly.

11. Method according to claim 1, comprising several guiding devices arranged in the direction of flow one after the other, wherein the ratio between the force perpendicular to and that parallel to the undisturbed direction of flow exerted by guiding devices in the direction of flow decreases in part of the assembly.

12. Method according to claim 1, wherein, moving through the assembly from the upstream to the downstream direction, the inclination of horizontal shaft turbines in part of the assembly decreases.

13. Method according to claim 1, wherein at least one device is set at an angle to the undisturbed direction of flow, without the shadow loss of devices on the downstream side at a distance less than 10 times the size of the inclined device concerned decreasing.

14. Method according to claim 1, comprising various assemblies, wherein at least one upstream assembly or one device thereof has a guiding function for at least one downstream assembly.

15. Method according to claim 1, wherein differences in density in the fluid are applied by heating or by cooling to generate said force.

16. Assembly comprising a plurality of devices for extracting energy from a fluid flow, said assembly comprising a guiding device by means of which forces having a component perpendicular to the undisturbed direction of flow are generated, such that fluid with kinetic energy differing from the kinetic energy that is effective in the situation where said force component is lacking is fed through said devices for extracting energy from a fluid, wherein said guiding device is a horizontal shaft turbine, the rotor shaft of which makes an angle of more than 5° with respect to the device for extracting energy from a fluid flow.

17. Assembly according to claim 16 comprising at least twenty devices for extracting energy, wherein the assembly extends in the dominant direction of flow over a length that is more than the width of the farm.

18. Assembly according to claim 16, having at least twenty devices for extracting energy, wherein the spacing between the turbines in the dominant direction of flow is less than 5 times the size of the turbines concerned.

19. Assembly according to claim 16, having at least twenty devices for extracting energy, wherein the total surface area occupied by the turbines takes up more than 5% of the surface area of the farm.

20. Assembly according to claim 16, wherein several devices for extracting energy are positioned together in groups with a spacing between the centers of the areas occupied of less than one and a half times the size of a turbine and wherein the groups act as guiding devices.

21. Assembly according to claim 16, wherein passive or active guiding devices are installed outside the farm and on the windward side with respect to the dominant wind direction.

22. Assembly according to claim 16, comprising a support construction for said device, wherein at least part of the support construction of at least one of the guiding or energy-extracting devices is provided with profiles by means of which a force perpendicular to the undisturbed fluid direction can be exerted in order to improve guiding.

23. Assembly according to claim 16, wherein at least one guiding device comprises a wind turbine having a tower that is so constructed as to exert a lateral force on the undisturbed fluid direction, such that the guiding by the turbine and tower combination improves.

24. Assembly according to claim 16, comprising a device with a horizontal shaft which has a guiding function and wherein said device has a fixed angle of tilt of greater than 10 degrees or a variably adjustable angle of tilt.

25. Assembly according to claim 16, wherein said device is a vertical shaft turbine that has the option of cyclically adjusting its blades, so that this turbine is able to exert a lateral force on the flow and thus can have a guiding function.

26. Assembly according to claim 16, wherein at least one guiding device is set up such that it is mobile.

27. Assembly according to claim 16, comprising an offshore wind farm.

28. Assembly according to claim 16, wherein said assembly is controlled by means of software that is self-learning and wherein optimisation is carried out with regard to the overall performance of the farm, to which the performances of the individual devices are subsidiary.

29. Assembly according to claim 16, wherein the assembly is controlled by means of software that also uses information on the stability of the atmosphere in order to set parameters comprising the scale of circulation, the position of any mobile devices or the setting of turbines with variable angles of tilt.

* * * * *